US009966842B1

(12) United States Patent
Jiang et al.

(10) Patent No.: US 9,966,842 B1
(45) Date of Patent: May 8, 2018

(54) PARALLEL VOLTAGE REGULATOR WITH SWITCHED CAPACITOR OR CAPACITOR-INDUCTOR BLOCKS

(71) Applicant: Google Inc., Mountain View, CA (US)

(72) Inventors: Shuai Jiang, Sarasota, CA (US); Chenhao Nan, Santa Clara, CA (US); Xin Li, San Jose, CA (US); Chee Chung, Milpitas, CA (US); Mobashar Yazdani, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/678,944

(22) Filed: Aug. 16, 2017

(51) Int. Cl.
*H02M 3/158* (2006.01)
*H02M 3/07* (2006.01)
*H02J 1/10* (2006.01)
*G05F 1/565* (2006.01)
*G05F 1/59* (2006.01)
*H02M 1/00* (2006.01)

(52) U.S. Cl.
CPC .............. *H02M 3/07* (2013.01); *G05F 1/565* (2013.01); *H02J 1/102* (2013.01); *H02M 3/1584* (2013.01); *H02M 2001/0022* (2013.01); *H02M 2003/072* (2013.01)

(58) Field of Classification Search
CPC ... H02M 2001/007; H02M 2001/0074; H02M 2001/0083; H02M 3/285; H02M 3/158; G05F 1/59
See application file for complete search history.

(56) References Cited

U.S. PATENT DOCUMENTS

| 7,696,735 | B2 | 4/2010 | Oraw et al. |
| 9,570,987 | B2 * | 2/2017 | Trinh ...................... H02M 1/36 |
| 9,584,034 | B2 * | 2/2017 | Deboy .............. H02M 3/33592 |
| 9,647,555 | B2 * | 5/2017 | Kooken ............... B23K 9/1056 |

OTHER PUBLICATIONS

Kim, Wonyoung, et al. "A Fully-Integrated 3-Level DC-DC 219, Converter for Nanosecond-Scale DVFS" IEEE Journal of Solid-State Circuits, vol. 47, No. 1, pp. 206-219, Jan. 2012.

* cited by examiner

*Primary Examiner* — Gary L Laxton
(74) *Attorney, Agent, or Firm* — McDermott Will & Emery LLP

(57) ABSTRACT

At least one aspect is directed to a power supply. The power supply includes one or more unregulated voltage converters. Each unregulated voltage converter includes a switched block producing an output voltage across its output terminals. The power supply includes a voltage supply input coupled to at least one of the unregulated voltage converters, and an unregulated voltage bus coupled to at least one of the unregulated voltage converters. The power supply includes a voltage regulator coupled to the unregulated voltage bus and producing a regulated voltage across its output terminals. The output terminals of the voltage regulator are connected in parallel to the output terminals of at least one of the unregulated voltage converters. This can produce a regulated output voltage across a pair of power supply output terminals.

20 Claims, 13 Drawing Sheets

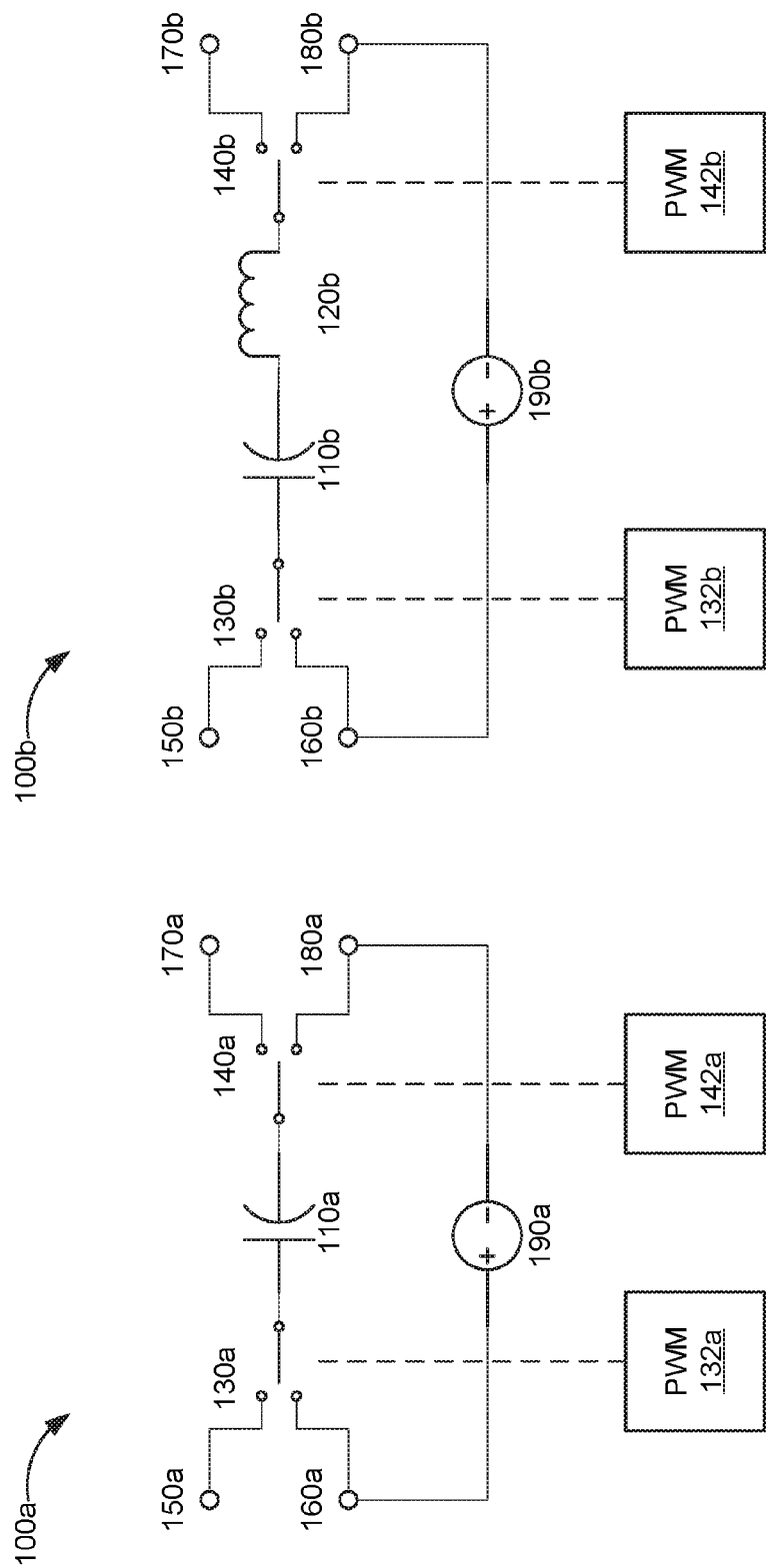

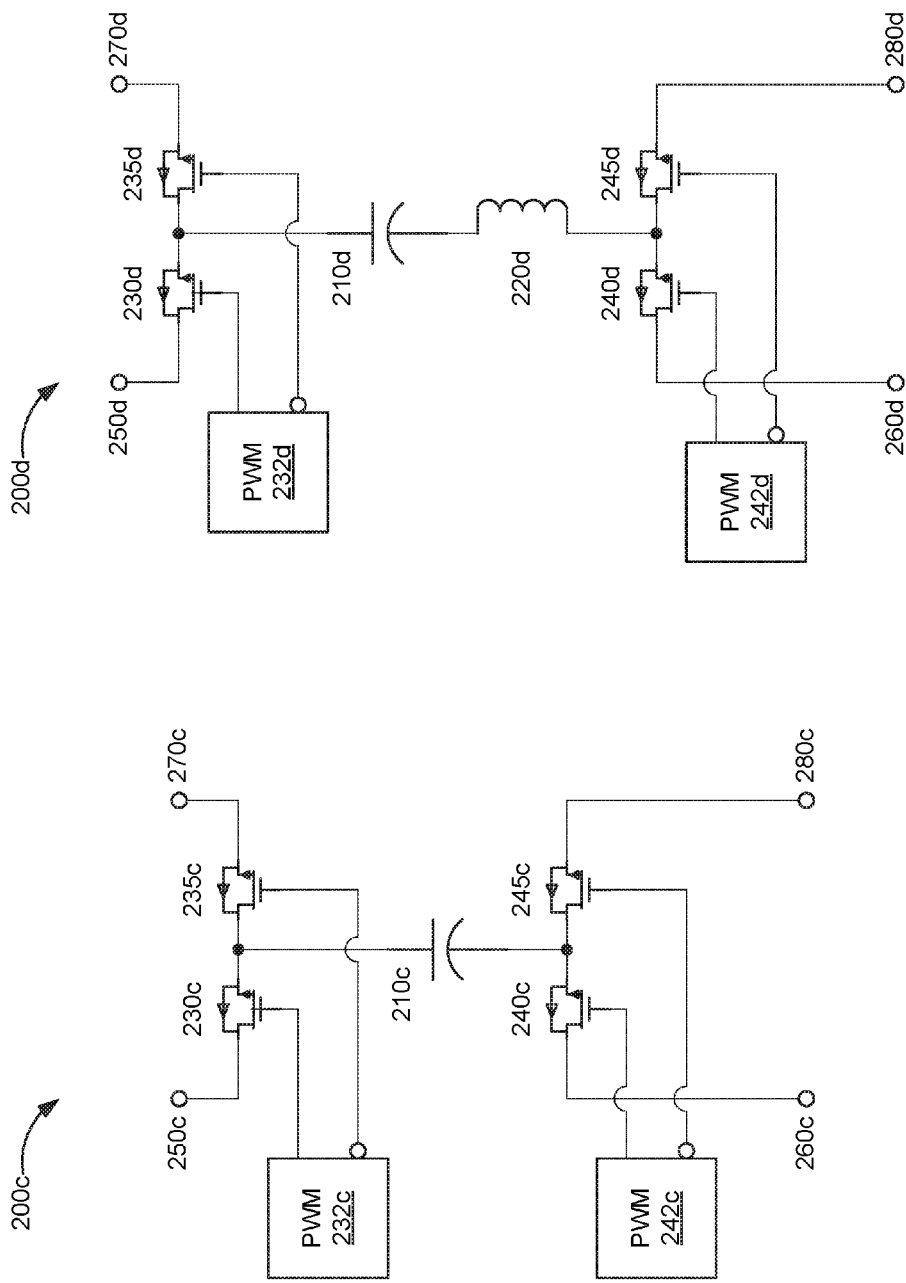

PARALLEL VOLTAGE REGULATOR WITH SWITCHED CAPACITOR OR CAPACITOR-INDUCTOR BLOCKS

BACKGROUND

Many power supply applications require a regulated (constant) output voltage. Unregulated DC-DC voltage converters can be considerably smaller and cheaper than a regulated voltage converter; however, regulating the output of unregulated voltage converters by passing it through a voltage regulator in a two-stage or cascade arrangement can negate the cost and size advantages of using the unregulated voltage converter.

SUMMARY

At least one aspect is directed to a power supply. The power supply includes one or more unregulated voltage converters. Each unregulated voltage converter including a switched block producing an output voltage across a first converter output terminal and a second converter output terminal. The power supply includes a voltage supply input coupled to at least one of the unregulated voltage converters. The power supply includes an unregulated voltage bus coupled to at least one of the unregulated voltage converters. The power supply includes a voltage regulator coupled to the unregulated voltage bus and producing a regulated voltage across a first regulator output terminal and a second regulator output terminal. The first regulator output terminal is connected to the first converter output terminal of at least one of the unregulated voltage converters, and the second regulator output terminal is connected to the second converter output terminal of the at least one unregulated voltage converter, to yield a regulated output voltage across a first power supply output terminal and a second power supply output terminal.

In some implementations, each switched block can include a first solid-state switch between a first input terminal of the switched block and a first terminal of a capacitor. Each switched block can include a second solid-state switch between a second input terminal of the switched block and a second terminal of the capacitor. Each switched block can include a third solid-state switch between the first terminal of the capacitor and the first converter output terminal of the switched block. Each switched block can include a fourth solid-state switch between the second terminal of the capacitor and the second converter output terminal of the switched block.

In some implementations, each switched block can include a first solid-state switch between a first input terminal of the switched block and a first terminal of a capacitor. Each switched block can include a second solid-state switch between a second input terminal of the switched block and the first terminal of the capacitor. Each switched block can include a third solid-state switch between a second terminal of the capacitor and the first converter output terminal of the switched block. Each switched block can include a fourth solid-state switch between the second terminal of the capacitor and the second converter output terminal of the switched block. In some implementations, the third solid-state switch and the fourth solid-state switch can have a voltage rating less than a maximum input voltage of the voltage supply input and greater than or equal to the regulated output voltage.

In some implementations, each switched block can include a tank circuit including a capacitor coupled in series to an inductor, the tank circuit having a first terminal and a second terminal. Each switched block can include a first solid-state switch between a first input terminal of the switched block and the first terminal of the tank circuit. Each switched block can include a second solid-state switch between a second input terminal of the switched block and a second terminal of the tank circuit. Each switched block can include a third solid-state switch between the first terminal of the tank circuit and the first converter output terminal of the switched block. Each switched block can include a fourth solid-state switch between the second terminal of the tank circuit and the second converter output terminal of the switched block.

In some implementations, each switched block can include a tank circuit including a capacitor coupled in series to an inductor, the tank circuit having a first terminal and a second terminal. Each switched block can include a first solid-state switch between a first input terminal of the switched block and a first terminal of the tank circuit. Each switched block can include a second solid-state switch between a second input terminal of the switched block and the first terminal of the tank circuit. Each switched block can include a third solid-state switch between a second terminal of the tank circuit and first converter output terminal of the switched block. Each switched block can include a fourth solid-state switch between the second terminal of the tank circuit and the second converter output terminal of the switched block. In some implementations, the third solid-state switch and the fourth solid-state switch can have a voltage rating less than a maximum input voltage of the voltage supply input and greater than or equal to the regulated output voltage.

In some implementations, the voltage regulator can have a non-inverting buck-boost configuration.

In some implementations, the voltage regulator can have an inverting buck-boost configuration.

In some implementations, the power supply can include N switched blocks numbered $B_1$ through $B_N$. Each switched block can have a first converter input terminal and a second converter input terminal. The voltage supply input can be coupled to the first converter input terminal of the $B_1$ switched block. The unregulated voltage bus can be coupled to the second converter input terminal of the $B_N$ switched block. For each switched block numbered $B_2$ through $B_N$, a first converter input terminal of the $B_i$ switched block can be coupled to the second converter input terminal of the $B_{i-1}$ switched block.

In some implementations, the power supply can include at least three switched blocks, wherein. The switched block $B_1$ can include a first solid-state switch between the first converter input terminal of the switched block and a first terminal of a capacitor. For switched blocks numbered $B_1$ through $B_{N-1}$, each switched block $B_i$ can include a second solid-state switch between the first terminal of the capacitor and a first terminal of the $B_{i+1}$ capacitor. The switched block $B_N$ can include a third solid-state switch between the first terminal of the capacitor and the second converter input terminal of the switched block.

In some implementations, the power supply can include at least three switched blocks. For odd values of i, the $B_i$ switched block can include a tank circuit having a capacitor and an inductor coupled in series. For even values of i, the $B_i$ switched block can include a capacitor. In some implementations, the switched block $B_1$ can include a first solid-state switch between the first converter input terminal of the switched block and a first terminal of the capacitor or tank circuit. For switched blocks numbered $B_1$ through $B_{N-1}$, each switched block $B_i$ can include a second solid-state switch between the first terminal of the capacitor or tank circuit and a first terminal of the $B_{i+1}$ capacitor or tank circuit. The switched block $B_N$ can include a third solid-state switch between the second converter input terminal of the switched block and the first terminal of the capacitor or tank circuit.

In some implementations, the first regulator output terminal is connected to the first converter output terminal of at least a second of the unregulated voltage converters, and the second regulator output terminal is connected to the second converter output terminal of the second unregulated voltage converter.

In some implementations, the voltage regulator can be a first voltage regulator. The power supply can include a second voltage regulator coupled to the unregulated voltage bus and producing a second regulated voltage across a third regulator output terminal and a fourth regulator output terminal. The third regulator output terminal can be connected to the first converter output terminal of at least a second of the unregulated voltage converters, and the fourth regulator output terminal can be connected to the second converter output terminal of the second unregulated voltage converter, to yield a second regulated output voltage across a third power supply output terminal and a fourth power supply output terminal.

In some implementations, each switched block can include a first solid-state switch between the first converter input terminal of the switched block and a first terminal of a capacitor. Each switched block can include a second solid-state switch between the second converter input terminal of the switched block and the first terminal of the capacitor. Each switched block can include a third solid-state switch between a second terminal of the capacitor and the first converter output terminal of the switched block. Each switched block can include a fourth solid-state switch between the second terminal of the capacitor and the second converter output terminal of the switched block. The first input terminal of each switched block numbered $B_2$ through $B_N$ can be coupled to a shunt capacitor.

In some implementations, each switched block can include a first solid-state switch between the first converter input terminal of the switched block and a first terminal of a capacitor. Each switched block can include a second solid-state switch between the second converter input terminal of the switched block and the first terminal of the capacitor. Each switched block can include a third solid-state switch between a second terminal of the capacitor and the first converter output terminal of the switched block. Each switched block can include a fourth solid-state switch between the second terminal of the capacitor and the second converter output terminal of the switched block. For even values of i, the first converter output terminal of the $B_i$ switched block can be coupled to the second converter output terminal of at least one odd numbered $B_j$ switched block, and the second converter output terminal of the $B_i$ switched block can be coupled to the first converter output terminal of the at least one odd numbered $B_j$ switched block.

At least one aspect is directed to method. The method includes receiving a voltage supply input at at least one of one or more unregulated voltage converters, each unregulated voltage converter including a switched block having a first converter output terminal and a second converter output terminal. The method includes producing, with each of the unregulated voltage converters, an output voltage across the first converter output terminal and the second converter output terminal. The method includes deriving an unregulated voltage bus from at least one of the unregulated voltage converters. The method includes providing the unregulated voltage bus to a voltage regulator. The method includes producing, with the voltage regulator, a regulated voltage across a first regulator output terminal and a second regulator output terminal. The method includes yielding a regulated output voltage across a first power supply output terminal a second power supply output terminal. The first power supply output terminal is connected to the first regulator output terminal and the first converter output terminal of at least one of the unregulated voltage converters. The second power supply output terminal is connected to the second regulator output terminal and the second converter output terminal of the at least one unregulated voltage converter.

In some implementations, the method can include providing the unregulated voltage bus to a second voltage regulator. The method can include producing, with the second voltage regulator, a second regulated voltage across a third regulator output terminal and a fourth regulator output terminal. The method can include yielding a second regulated output voltage across a third power supply output terminal and a fourth power supply output terminal. The third power supply output terminal is connected to the third regulator output terminal and the first converter output terminal of at least a second of the unregulated voltage converters. The fourth power supply output terminal connected to the fourth regulator output terminal and the second converter output terminal of the second unregulated voltage converter.

In some implementations, the first power supply output terminal is connected to the first converter output terminal of at least two unregulated voltage converters, and the second power supply output terminal is connected to the second converter output terminal of the at least two unregulated voltage converters.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 1A through 1D show simplified schematic drawings of example unregulated voltage convertor switched blocks, according to illustrative implementations;

FIGS. 2A through 2D show schematic drawings of example unregulated voltage convertor switched blocks, according to illustrative implementations;

DETAILED DESCRIPTION

Figures 1C, 1D:
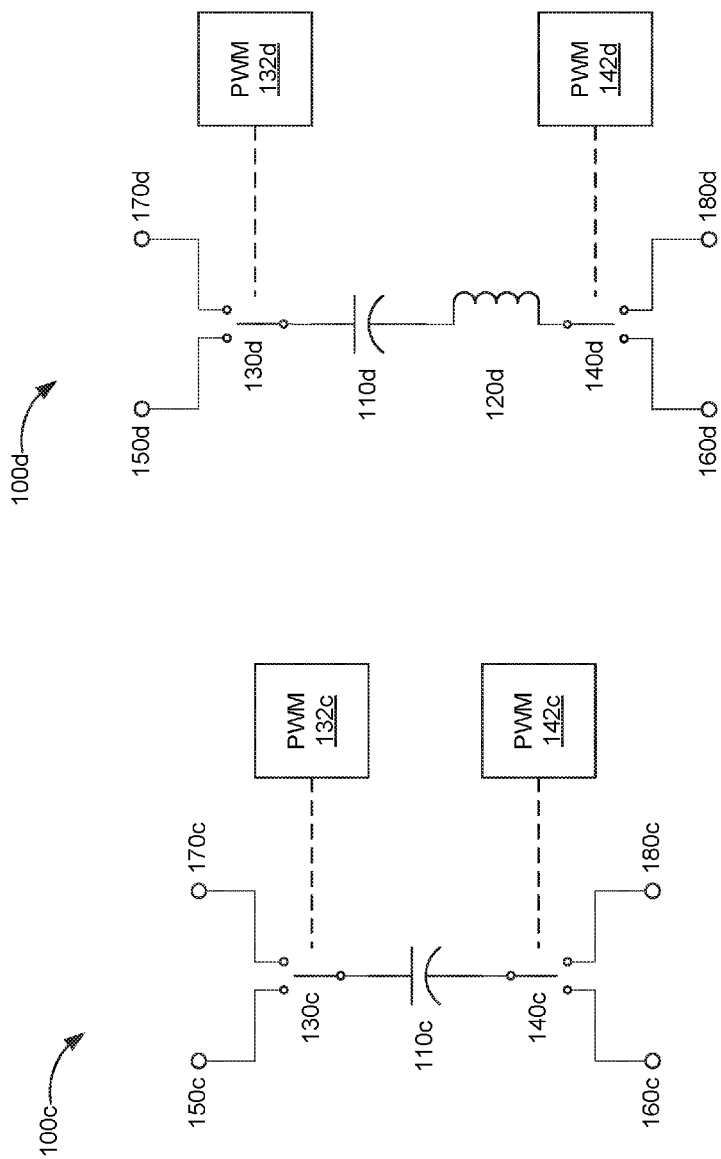

Following below are descriptions of various concepts related to, and implementations of, a system and method to supply power using a parallel voltage regulator with switched capacitors or capacitor-inductor blocks. The various concepts introduced above and discussed in greater detail below may be implemented in any of numerous ways, as the described concepts are not limited to any particular manner of implementation. Examples of specific implementations and applications are provided primarily for illustrative purposes.

This disclosure generally relates to parallel voltage regulator architectures with switched capacitor or capacitor-inductor ("LC" or "tank") blocks. Certain power supply applications can benefit from high density and highly efficient direct current-to-direct current (DC-DC) power conversion. When the application requires regulated output voltage, however, achieving the desired density and efficiency becomes challenging.

For example, regulated DC-DC converters are relatively large and expensive. While unregulated voltage converters can be smaller and less expensive, regulating their output has traditionally required that the entire output flow through a voltage regulator. Such a two-stage, cascade configuration has at least two drawbacks. First, the voltage regulator must be rated for the entire output power of the power supply, making it relatively large and expensive. Second, the cascade configuration has a cumulative effect on power loss through the unregulated voltage converters and the voltage regulator. For example, if the unregulated voltage converter is 95% efficient and the voltage regulator is 90% efficient, the overall efficiency of the power supply will be 0.95*0.90=86%.

This disclosure proposes a power supply based on a parallel, rather than cascade, arrangement of unregulated voltage converters and a voltage regulator. For example, a power supply of the present disclosure can have a relatively small and efficient unregulated voltage converter and a voltage regulator arranged with their outputs in parallel. In this arrangement, the voltage regulator need only handle as much power as is necessary to regulate the output of the unregulated voltage converters. Moreover, the overall efficiency of the system will approximate the weighted average, based on the power supplied by the each part of the power supply, of the respective efficiencies. For example, if the unregulated voltage converters provide 70% of the output power at 95% efficiency and the voltage regulator provides 30% of the output power at 90% efficiency, then the overall efficiency of the power supply will be 0.95*0.70+0.90*0.30=0.67+0.27=94% efficiency. The resulting power supply is smaller and cheaper, and exhibits less heat dissipation than a cascade arrangement.

FIGS. 1A through 1D show simplified schematic drawings of example unregulated voltage convertor switched blocks 100a-100d (collectively "switched blocks 100"), according to illustrative implementations. The switched blocks 100 can be in a series configuration (e.g., switched blocks 100a and 100b) or a parallel configuration (e.g., switched blocks 100c and 100d). The switched blocks 100a and 100c include a capacitor 110a or 110c, respectively. The switched blocks 100b and 100d include a capacitor-inductor ("LC" or "tank") circuit made up of a capacitor 110b or 100d in series with an inductor 120b or 120d, respectively. Each switched block 100 includes two single-pole, double-throw (SPDT) switches 130a-130d and 140a-140d (collectively "switches 130 and 140"). Each switched block 100 includes input terminals 150a-150d and 160a-160d (collectively "input terminals 150 and 160") and output terminals 170a-170d and 180a-180d (collectively "output terminals 170 and 180"). The switches 130 and 140 are controlled by pulse-width modulators (PWMs) 132a-132d and 142a-140d, respectively (collectively "PWMs 132 and 142").

FIG. 1A shows the switched block 100a, which includes the capacitor 110a in a series configuration. The SPDT switch 130a electrically couples either the first input terminal 150a or the second input terminal 160a to a first terminal of the capacitor 110a. The SPDT switch 140a electrically couples a second terminal of the capacitor 110a to either the first output terminal 170a or the second output terminal 180a. The switch 130a can operate under the control of the PWM 132a, and the switch 140a can operate under the control of the PWM 142a. In some implementations, the functions of the PWMs 132a and 142a can be performed by a single PWM. The input reference ground and the output reference ground (i.e., the potential on terminals 160a and 180a, respectively) can have shifted voltage levels. The switched block 100a can include an additional voltage source 190a to form a complete circuit loop between the reference grounds of terminals 160a and 180a, and set the voltage offset between the two.

FIG. 1B shows the switched block 100b, which includes an "LC" or "tank" circuit in a series configuration. The tank circuit includes the capacitor 110b and the inductor 120b connected in series. The SPDT switch 130b electrically couples either the first input terminal 150b or the second input terminal 160b to a first terminal of the tank circuit. The SPDT switch 140b electrically couples a second terminal of the tank circuit to either the first output terminal 170b or the second output terminal 180b. The switch 130b can operate under the control of the PWM 132b, and the switch 140b can operate under the control of the PWM 142b. In some implementations, the functions of the PWMs 132b and 142b can be performed by a single PWM. The input reference ground and the output reference ground (i.e., the potential on terminals 160b and 180b, respectively) can have shifted voltage levels. The switched block 100b can include an additional voltage source 190b to form a complete circuit loop between the reference grounds of terminals 160b and 180b, and set the voltage offset between the two.

FIG. 1C shows the switched block 100c, which includes the capacitor 110c in a parallel configuration. The SPDT switch 130c electrically couples either the first input terminal 150c or the first output terminal 170c to a first terminal of the capacitor 110c. The SPDT switch 140c electrically couples a second terminal of the capacitor 110c to either the second input terminal 160c or the second output terminal 180c. The switch 130c can operate under the control of the PWM 132c, and the switch 140c can operate under the control of the PWM 142c. In some implementations, the functions of the PWMs 132c and 142c can be performed by a single PWM.

FIG. 1D shows the switched block 100d, which includes a tank circuit in a parallel configuration. The tank circuit includes the capacitor 110d and the inductor 120d connected in series. The SPDT switch 130d electrically couples either the first input terminal 150d or the first output terminal 170d to a first terminal of the tank circuit. The SPDT switch 140d electrically couples a second terminal of the tank circuit to either the second input terminal 160d or the second output terminal 180d. The switch 130d can operate under the control of the PWM 132d, and the switch 140d can operate under the control of the PWM 142d. In some implementations, the functions of the PWMs 132d and 142d can be performed by a single PWM.

The switched blocks 100 can convert a DC voltage across the input terminals 150 and 160 to a DC voltage across the output terminals 170 and 180. In some implementations, the DC input voltage can be transformed to a DC output voltage with a 1:1 ratio. In some implementations, the ratio can be higher or lower. In some implementations, the PWMs 132 and 142 operate without feedback or control such that the ratio remains constant during operation of the switched block. Accordingly, the output voltage—i.e., the voltage across the output terminals 170 and 180—will remain proportional to the input voltage—i.e., the voltage across the input terminals 150 and 160, and the output voltage will vary with the input voltage. Thus, the switched block 100 operates as an unregulated DC-DC voltage converter.

FIGS. 2A through 2D show schematic drawings of example unregulated voltage convertor switched blocks 200a-200d (collectively "switched blocks 200"), according to illustrative implementations. The switched blocks 200 are similar in structure and function to the switched blocks 100 described previously. The switched blocks 200, however, are described in terms of the solid-state switches that make up the SPDT switches 130 and 140. The solid-state switches include solid-state switches 230a-230d, 235a-235d, 240a-240d, and 245a-245d (collectively "solid-state switches 230," "solid-state switches 235," "solid-state switches 240," "solid-state switches 245," respectively). The solid-state switches 230, 235, 240, and 245 can each be a transistor, a field-effect transistor (FET), a metal-oxide semiconductor FET (MOSFET), a solid-state relay, an insulated-gate bipolar transistor (IGBT), or any controllable semiconductor switching component. The solid-state switches 230, 235, 240, and 245 can be arranged in pairs to perform the functions of the SPDT switches 130 and 140 previously described. The solid-state switches 230, 235, 240, and 245 can be driven by two pulse-width modulator (PWM) control signals. The PWMs 232a-232d and 242a-242d (collectively "PWMs 232" and "PWMs 242") can provide the PWM control signals to the solid-state switches 230 and 235 and solid-state switches 240, and 245, respectively. In some implementations, functions of the PWM 232 and 242 can be combined into a single PWM. In some implementation additional components such as buffers and/or inverters can be used to provide PWM control signals to each of the solid-state switches 230, 235, 240, and 245 based on the signal or signals provided by the PWM. The PWM control signals going to a pair of solid-state switches 230 and 235, or solid-state switches 240 and 245, can be complementary signals (i.e., one is logic high while the other is logic low) with a duty cycle of approximately 50%. In some implementations, the frequency of the PWM control signals can be from several hundred hertz to tens of megahertz. In some implementations, the frequency of the PWM control signals can be from be from tens of kilohertz to several megahertz. In some implementations, the frequency of the PWM control signals can be from approximately 100 kilohertz to 1 megahertz.

Figure 2A:
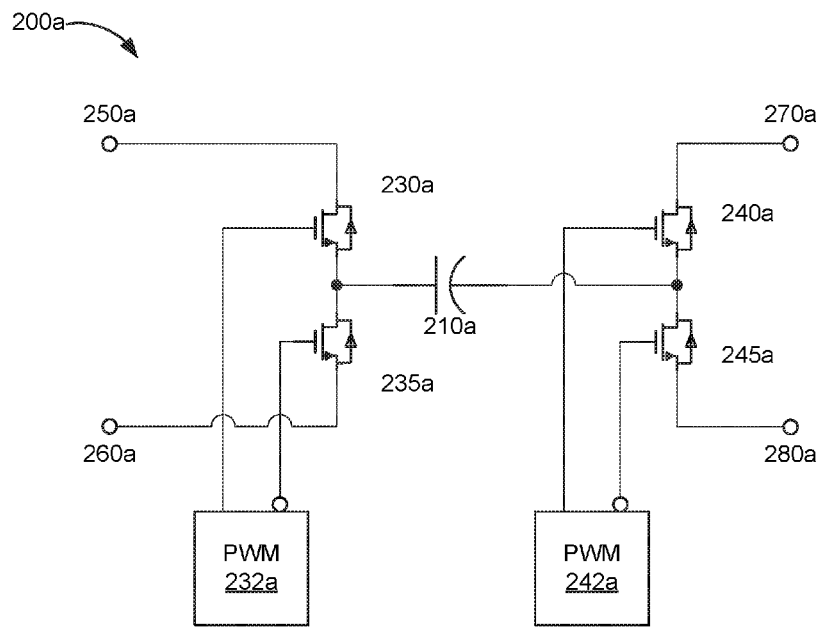

FIG. 2A shows a schematic drawing of an example unregulated voltage convertor switched block 200a. The switched block 200a includes a first input terminal 250a and a second input terminal 260a. The solid-state switch 230a controllably couples the first input terminal 250a to a first terminal of a capacitor 210a. The solid-state switch 235a controllably couples the second input terminal 260a to the first terminal of the capacitor 210a. The PWM 232a provides a PWM control signal and a complementary PWM control signal to the solid-state switches 230a and 235a, respectively. The switched block 200a includes a first output terminal 270a and a second output terminal 280a. The solid-state switch 240a controllably couples the first output terminal 270a to a second terminal of the capacitor 210a. The solid-state switch 245a controllably couples the second output terminal 280a to the second terminal of the capacitor 210a. The PWM 242a provides a PWM control signal and a complementary PWM control signal to the solid-state switches 240a and 245a, respectively. In some implementations, functions of the PWM 232a and 242a can be combined into a single PWM.

Figure 2B:
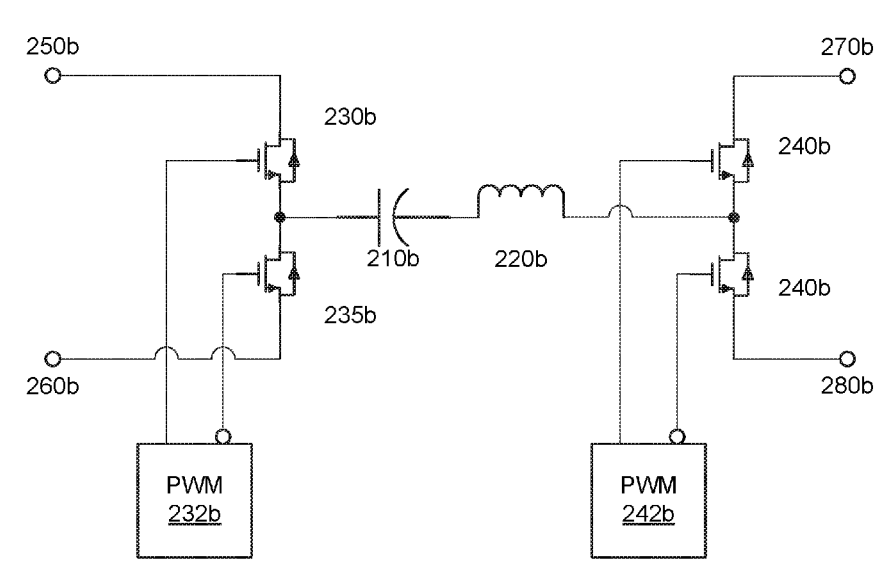

FIG. 2B shows a schematic drawing of an example unregulated voltage convertor switched block 200b. The switched block 200b includes a first input terminal 250b and a second input terminal 260b. The solid-state switch 230b controllably couples the first input terminal 250b to a first terminal of a tank circuit that includes a capacitor 210b connected in series to an inductor 220b. The solid-state switch 235b controllably couples the second input terminal 260b to the first terminal of the tank circuit. The PWM 232b provides a PWM control signal and a complementary PWM control signal to the solid-state switches 230b and 235b, respectively. The switched block 200b includes a first output terminal 270b and a second output terminal 280b. The solid-state switch 240b controllably couples the first output terminal 270b to a second terminal of the tank circuit. The solid-state switch 245b controllably couples the second output terminal 280b to the second terminal of the tank circuit. The PWM 242b provides a PWM control signal and a complementary PWM control signal to the solid-state switches 240b and 245b, respectively. In some implementations, functions of the PWM 232b and 242b can be combined into a single PWM.

In implementation of power supplies using switched blocks 200a and 200b, the solid-state switches need not handle the full input voltage of the power supply. Rather, they may only need to be rated for the desired regulated output voltage. Accordingly, such power supplies can use standard low-voltage parts. For example, if the regulated output voltage is 12 V, the solid-state switches can be standard 12 V MOSFETs.

FIG. 2C shows a schematic drawing of an example unregulated voltage convertor switched block 200c. The switched block 200c includes a first input terminal 250c and a second input terminal 260c. The solid-state switch 230c controllably couples the first input terminal 250c to a first terminal of a capacitor 210c. The solid-state switch 240c controllably couples the second input terminal 260c to a second terminal of the capacitor 210c. The switched block 200c includes a first output terminal 270c and a second output terminal 280c. The solid-state switch 235c controllably couples the first output terminal 270c to the first terminal of the capacitor 210c. The solid-state switch 245c controllably couples the second output terminal 280a to the second terminal of the capacitor 210c. The PWM 232c provides a PWM control signal and a complementary PWM control signal to the solid-state switches 230c and 235c, respectively. The PWM 242c provides a PWM control signal and a complementary PWM control signal to the solid-state switches 240c and 245c, respectively. In some implementations, functions of the PWM 232c and 242c can be combined into a single PWM.

FIG. 2D shows a schematic drawing of an example unregulated voltage convertor switched block 200d. The switched block 200d includes a first input terminal 250d and a second input terminal 260d. The solid-state switch 230d controllably couples the first input terminal 250d to a first terminal of a tank circuit that includes a capacitor 210d connected in series to an inductor 220d. The solid-state switch 240d controllably couples the second input terminal 260d to a second terminal of the tank circuit. The switched block 200d includes a first output terminal 270d and a second output terminal 280d. The solid-state switch 235d controllably couples the first output terminal 270d to the first terminal of the tank circuit. The solid-state switch 245d controllably couples the second output terminal 280d to the second terminal of the tank circuit. The PWM 232d provides a PWM control signal and a complementary PWM control signal to the solid-state switches 230d and 235d, respectively. The PWM 242d provides a PWM control signal and a complementary PWM control signal to the solid-state switches 240d and 245d, respectively. In some implementations, functions of the PWM 232d and 242d can be combined into a single PWM.

Figure 3:
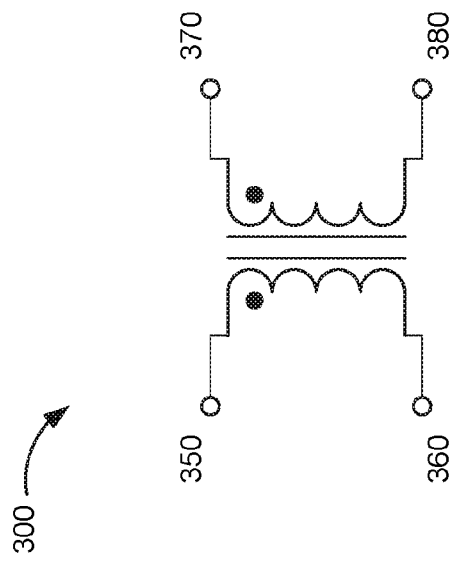
FIG. 3 shows a symbol representation of an unregulated voltage converter switched block, according to an illustrative implementation.

FIG. 3 shows a symbol representation of an unregulated voltage converter switched block 300, according to an illustrative implementation. Each switched block 100 or 200 as described with reference to FIGS. 1 and 2 can be represented by the switched block 300 symbol. The symbol resembles a transformer; however, the switched block 300 is meant to convert direct-current voltages (including the possible presence of alternating-current ripples). The switched block 300 can be used to represent a generic switched block when any of the previously described switched blocks 100 or 200 can perform the desired function of the broader circuit of which it is a component. A power supply according to this disclosure can include a plurality of switched blocks 100 and/or 200, including combinations of different types of switched blocks 100 and/or 200. As with the switched blocks 100 and 200, in some implementations, the input and output reference voltages can be shifted or offset; that is, they need not share a common ground.

The switched block 300 includes a first input terminal 350, a second input terminal 360, a first output terminal 370, and a second output terminal 380. Each can represent one of the first input terminals 150 or 250, second input terminals 160 or 260, first output terminals 170 or 270, or second output terminals 180 or 280, respectively.

Figure 4:
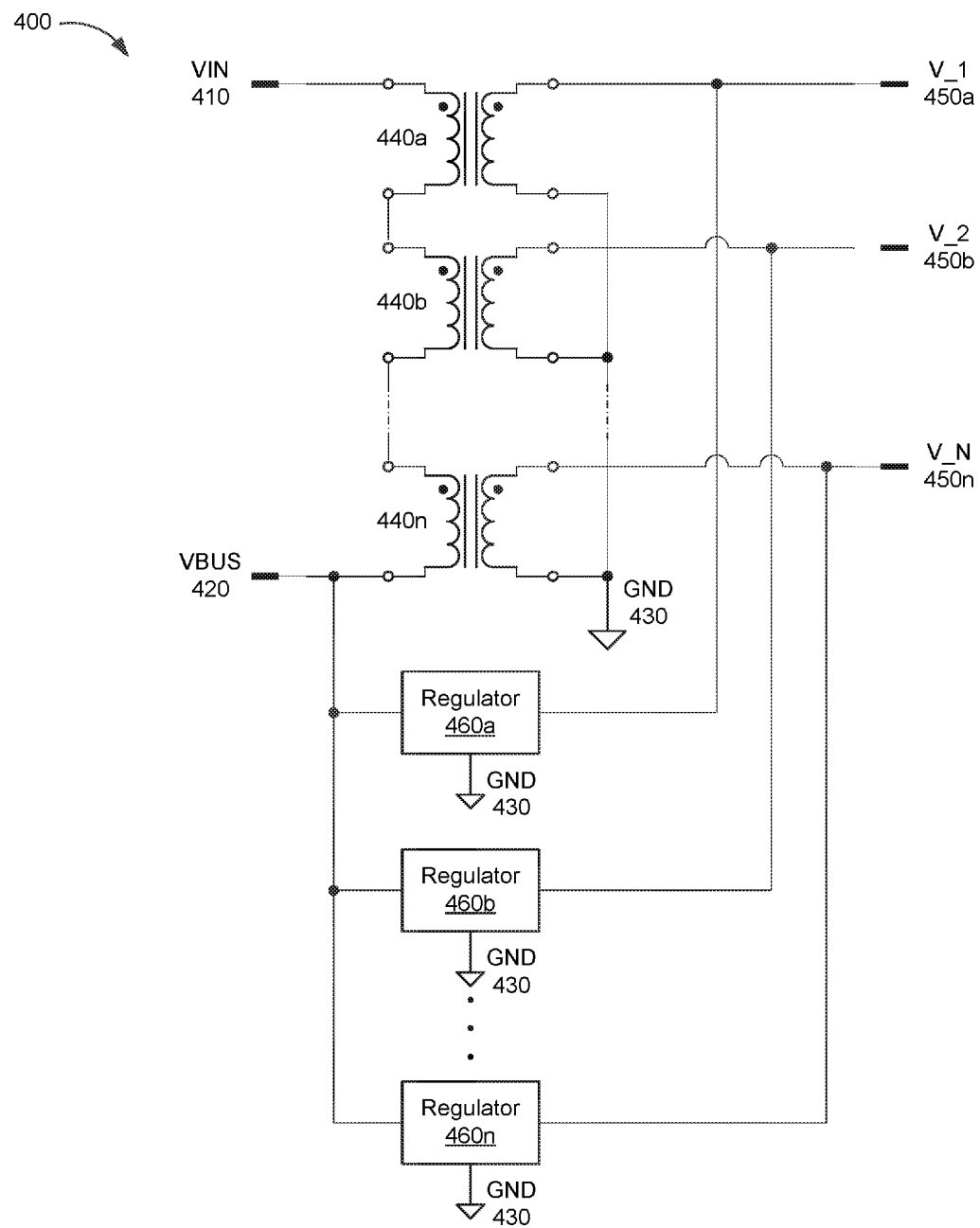
FIG. 4 shows a simplified schematic of a power supply architecture having several independent regulated outputs, according to an illustrative implementation.

FIG. 4 shows a simplified schematic of a power supply 400 architecture having several independent regulated outputs 450a-450n, according to an illustrative implementation. The power supply 400 receives an input voltage 410, which is fed in series through each of the switched blocks 440a-440n (collectively "switched blocks 440"). That is, the input voltage is connected to a first input terminal of the first switched block 440a. The second input terminal of the first switched block 440a is connected to the first input terminal of the second switched block 440b, the second input terminal of the second switched block 440b is connected to the first input terminal of the next switched block 440, and so on. The second input terminal of the last switched block 440n is connected to an unregulated voltage bus 420. The unregulated voltage bus 420 connects to one or more voltage regulators 460a-460n (collectively "voltage regulators 460"), which regulate the output voltage of the switched blocks 440.

In the example power supply 400, a second output terminal of each switched block 440 is connected to ground 430. Thus, each output 450a-450n (collectively "output 450") can provide an output voltage V_1-V_N with reference to ground potential at each first output terminal of each switched block 440, respectively.

The input of each voltage regulator 460 is connected to the unregulated voltage bus 420. Each voltage regulator 460 can provide a different output voltage 450. For example and without limitation, in some implementations, voltage regulator 460a can have an output voltage V_1 of 12 V, voltage regulator 460b can have an output voltage V_2 of 18 V, and voltage regulator 460n can have an output voltage V_N of 24 V. In some implementations, every voltage regulator 460 can have an output voltage of 12 volts. In some implementations, the outputs 450 can be connected in parallel.

In some implementations, each output voltage can have a different value (i.e., V_1≠V_2≠V_N, etc.). In some implementations, the output of each switched block 440 can be regulated by a respective voltage regulator 460. For example, the voltage regulator 460a can regulate the output of the switched block 450a at a voltage value of V_1, the voltage regulator 460b can regulate the output of the switched block 450b at a voltage value of V_2, and so on.

In some implementations, each output voltage can have the same value (i.e., V_1=V_2=V_N, etc.). In some implementations, the outputs of all of the switched blocks 440 can be connected in parallel, and their output voltages can be regulated by a single voltage regulator 460.

In some implementations, some, but not all, of the output voltages 450 can have the same value (e.g., V_1=V_2≠V_N, etc.). Switched blocks 440 having equivalent or substantially equivalent regulated output voltage levels can be connected in parallel, as described above. In some implementations, the power supply 400 can include a voltage regulator 460 for each desired output voltage value.

Generally, there is a relation among the voltages of the power supply 400. In particular, the sum of V_1, V_2, . . . V_N can equal the difference between VIN and VBUS. That is: VIN−VBUS=SUM{V_1, V_2, . . . V_N}. VIN may vary based on the source of power to the power supply 400, and the regulated outputs V_1, V_2, . . . V_N can be held substantially constant by the voltage regulators 460, therefore VBUS can vary with VIN according to the formula VBUS=VIN−SUM{V_1, V_2, . . . V_N}. Accordingly, the type of voltage regulator chosen for use as the voltage regulators 460 can depend upon the desired regulated voltage and the expected range of VBUS based on the above formula. For example, and without limitation, if during normal operation VBUS is expected to always have a higher voltage of the same polarity relative to the regulated voltage, the voltage convertor 460 can have a buck, or step-down, converter design. If during normal operation VBUS is expected to always have a lower voltage of the same polarity relative to the regulated voltage, the voltage convertor 460 can have a boost converter design. If during normal operation VBUS can be expected to vary between higher and lower voltages of the same polarity relative to the regulated voltage, the voltage convertor 460 can have a non-inverting buck-boost converter design. If during normal operation VBUS can be expected to vary between higher and lower voltage amplitudes, but of opposite polarity relative to the regulated voltage, the voltage convertor 460 can have an inverting buck-boost converter design. Other DC-DC converter designs can be used depending on the desired output voltage 460 and the expected range of voltages on the unregulated voltage bus 420. Each voltage regulator 460 can include its own feedback loop and a controller with which it regulates own output voltage. In regulating the output voltages of the switched blocks 440, the voltage regulators 460 can deliver power to each output load in parallel with the switched blocks 440. The switched blocks 440 can operate at a higher efficiency and density relative to the voltage regulators 460. Although the voltage regulators 460 may operate at relatively lower efficiencies and densities, the voltage regulators 460 are only providing a fraction of the power to the loads, with the switched blocks 440 providing the rest. Accordingly, the total converter efficiency and density can be higher than a two-stage converter architecture in which all power delivered to the load must pass through a voltage regulator.

In some implementations, the input side of the switched blocks 440 are connected in series between the voltage input 410 and the unregulated voltage bus 420. Accordingly, the voltage across the input terminals of each converter will equal the difference between VIN and VBUS, divided by the number of switched blocks. Additionally, each of the switched blocks 440 can have a 1:1 voltage conversion ratio (although the precise output voltage will be regulated by the voltage regulators 460). Thus the input voltage of each switched block 440 will be a fraction of VIN, and the output voltage of each switched block 440 will be close to the input voltage. In implementations where the switched blocks 440 have a series configuration, such as the switched blocks 220a and 220b previously described, the solid-state switches need only be rated for the desired regulated output voltage. Accordingly, the switched blocks 440 can include standard low-voltage solid-state switches. For example, if the regulated output voltage is 12 V, the solid-state switches can be standard 12 V MOSFETs. Solid-state switches rated for a lower voltage can be smaller and cheaper than parts rated for the full input voltage VIN, which may reach or exceed 60 V. Accordingly, in implementations employing switched blocks 220a and 220b arranged with their input terminals connected in series between the voltage input 410 and the unregulated voltage bus 420, the power supply 400 can be smaller and cheaper than if the solid-state switches needed to be rated for the full VIN.

Figure 5:
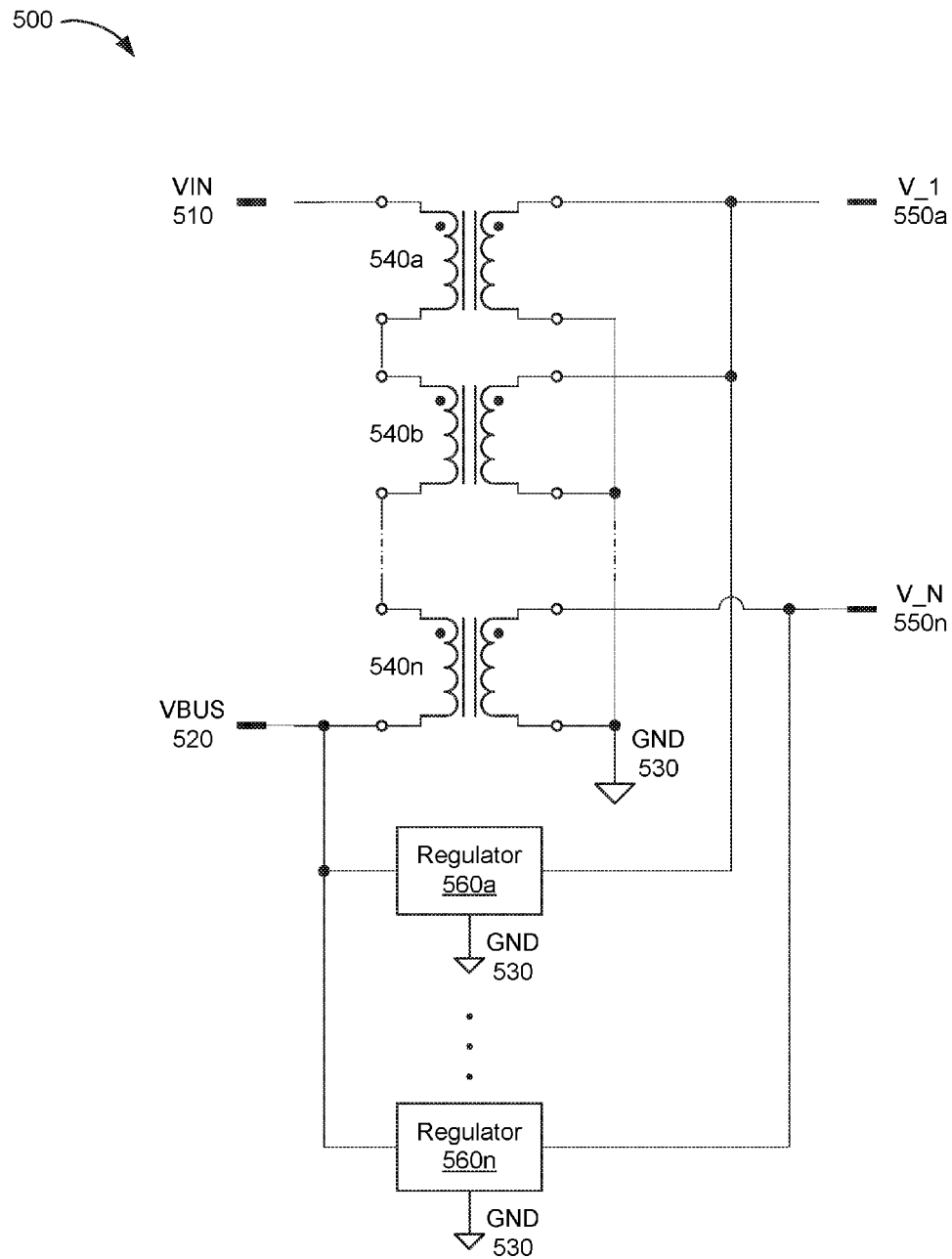
FIG. 5 shows a simplified schematic of a power supply architecture having combined regulated output, according to an illustrative implementation.

FIG. 5 shows a simplified schematic of a power supply 500 architecture having combined regulated output 550a, according to an illustrative implementation. The power supply 500 is similar to the power supply 400 described previously; however, the power supply 500 has the outputs of two of its switched blocks 540a and 540b connected in parallel as a single output 550a. The power supply 500 receives an input voltage 510, which is fed in series through each of the switched blocks 540a-540n (collectively "switched blocks 540"). That is, the input voltage is connected to a first input terminal of the first switched block 540a. The second input terminal of the first switched block 540a is connected to the first input terminal of the second switched block 540b, the second input terminal of the second switched block 540b is connected to the first input terminal of the next switched block 540, and so on. The second input terminal of the last switched block 540n is connected to an unregulated voltage bus 520. The unregulated voltage bus 520 connects to one or more voltage regulators 560a-560n (collectively "voltage regulators 560"), which regulate the output voltage of the switched blocks 540.

In the example power supply 500, a second output terminal of each switched block 540 is connected to ground 530. Thus, each output 550a-550n (collectively "output 550") can provide an output voltage V_1-V_N with reference to ground potential at each first output terminal of each switched block 540, respectively.

In the example power supply 500, the outputs of the switched blocks 540a and 540b are connected in parallel. That is, a first output terminal of the switched block 540a is connected to a first output terminal of the switched block 540b, and a second output terminal of the switched block 540a is connected to a second output terminal of the switched block 540b, as well as to ground 530. The parallel outputs of the switched blocks 540a and 540b can be regulated at an output voltage of V_1 by a single voltage regulator 560a. In some implementations, additional switched blocks 540 can be connected in parallel, with each switched block contributing additional power to the output 550a. The power output by the switched blocks 540 connected to the output 550a can all be regulated by the single voltage regulator 560a. While the power handling components of the voltage regulator 560a may need to be bigger to regulate the additional output power, the feedback and switching electronics of the voltage regulator 560a need not be expanded. Therefore, the increased ratio of switched blocks 540 to voltage regulators 560 can increase the density of the power supply 500.

Similar to the power supply 400, there is a relation among the voltages of the power supply 500. In particular, the sum of the output voltages V_1 through V_N can equal the difference between VIN and VBUS. That is: VIN−VBUS=SUM{V_1, . . . V_N}. Therefore, in the power supply 500, VBUS can be found according to the formula VBUS=VIN−SUM{2*V_1, V_2, . . . V_N}. A type of voltage regulator 560 can be chosen based on the same constraints as described above for the voltage regulators 460 of the power supply 400.

Figure 6:
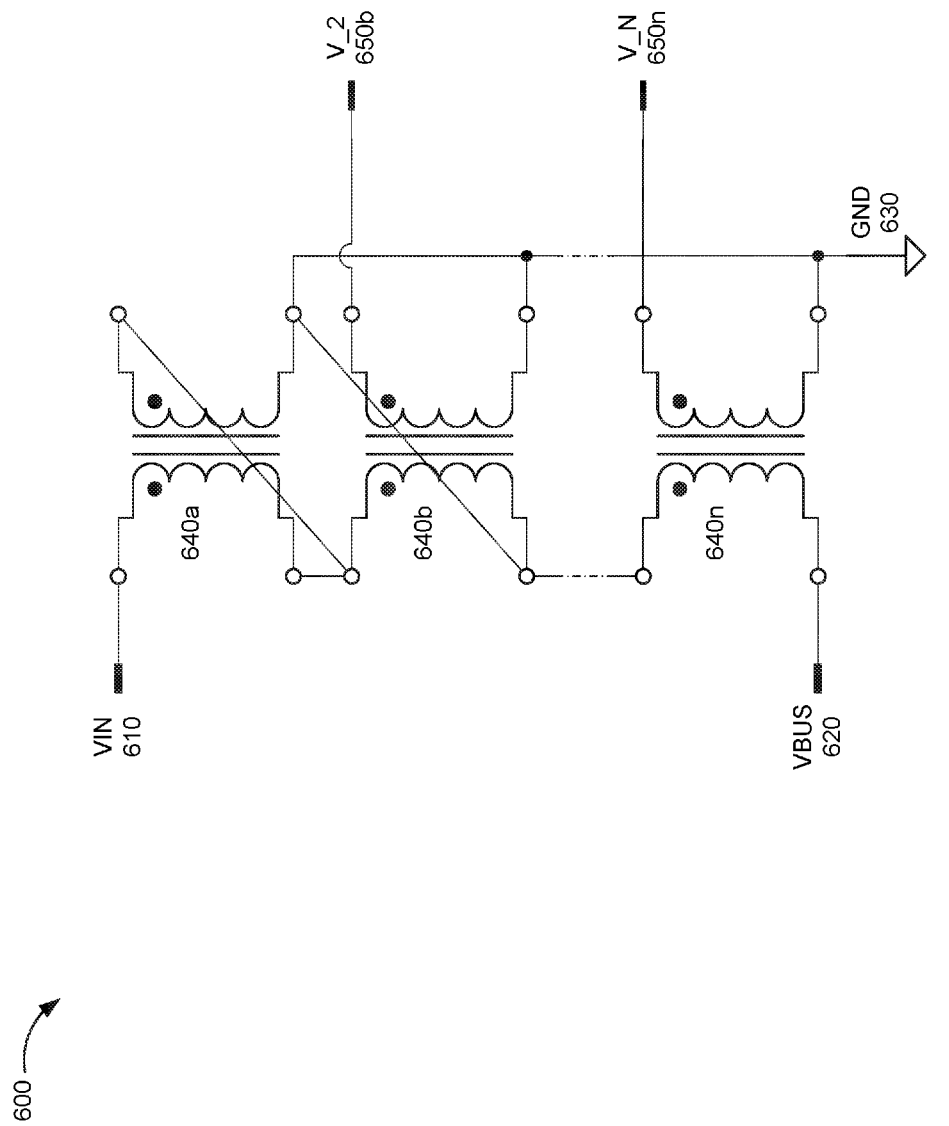
FIG. 6 shows a simplified schematic of a power supply architecture having combined regulated outputs, according to an illustrative implementation.

FIG. 6 shows a simplified schematic of a power supply 600 architecture having combined regulated outputs, according to an illustrative implementation. The power supply 600 is similar to the power supply 400 described previously; however, in power supply 600, the output 650a of the switched block 640a is connected to the input of the switched block 640b.

The power supply 600 receives an input voltage 610, which is fed in series through each of the switched blocks 640a-640n (collectively "switched blocks 640"). That is, the input voltage is connected to a first input terminal of the first switched block 640a. The second input terminal of the first switched block 640a is connected to the first input terminal of the second switched block 640b, the second input terminal of the second switched block 640b is connected to the first input terminal of the next switched block 640, and so on. The second input terminal of the last switched block 640n is connected to an unregulated voltage bus 620. The unregulated voltage bus 620 can connect to the input of one or more voltage regulators, which regulate the output voltage of the switched blocks 640 in the same manner as described previously for the power supplies 400 and 500.

Each switched block 640 of the power supply 600 has an output 650a-650n (collectively "output 650"). In the example power supply 600, a second output terminal of each switched block 640b-640n is connected to ground 630. Thus, each output 650b-650n as provided at each first output terminal of the switched blocks 640 can provide an output voltage referenced to ground potential.

In the example power supply 600, the output 650a of the first switched block 640a is connected to the input of the second switched block 650b. That is, a first output terminal of the output 650a is connected to a first input terminal of the second switched block 640b, and a second output terminal of the output 650a is connected to a second input terminal of the second switched block 640b. In this configuration, like the configuration of the power supply 500, V_1=V_2. Accordingly, the voltage of the unregulated voltage bus will be: VBUS=VIN−SUM{2*V_1,V_2, . . . V_N}.

Figure 7:
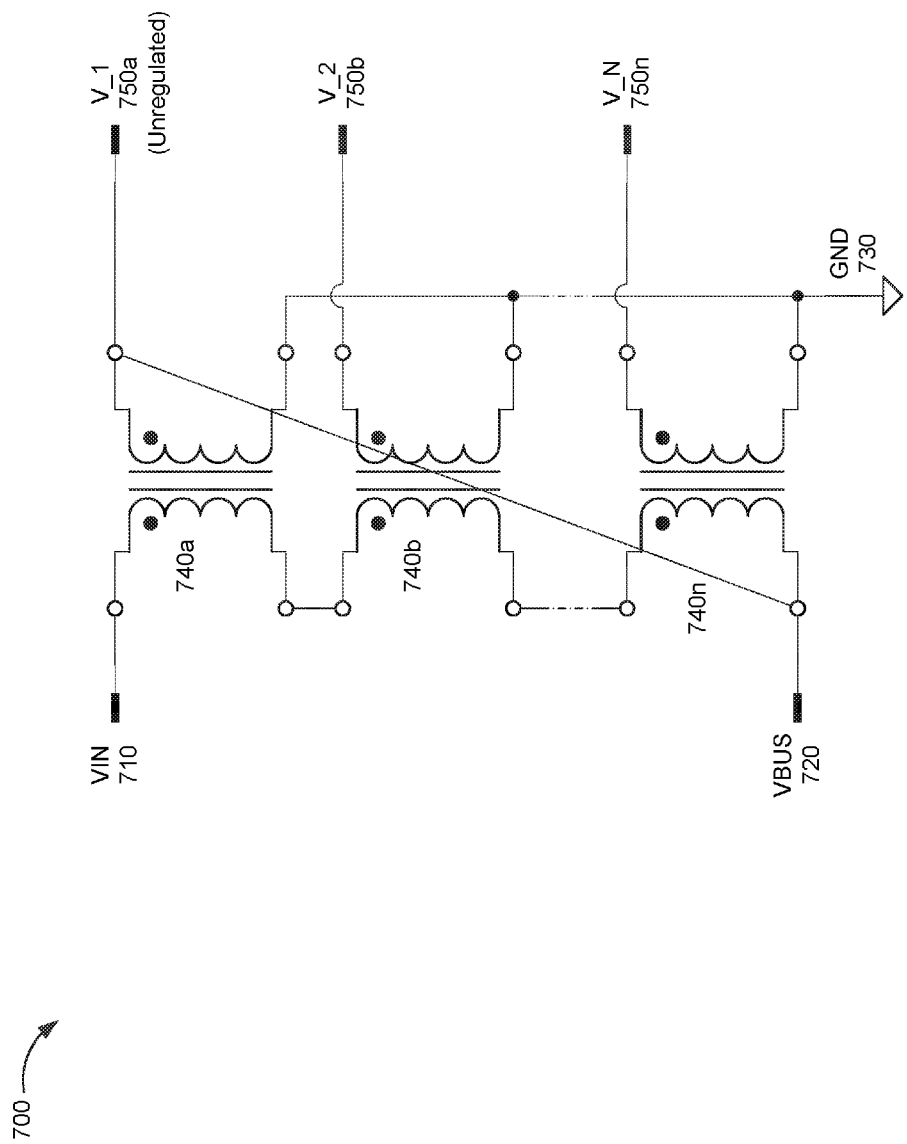
FIG. 7 shows a simplified schematic of a power supply architecture having an output in parallel with a voltage bus, according to an illustrative implementation.

FIG. 7 shows a simplified schematic of a power supply 700 architecture having an output 750a in parallel with an unregulated voltage bus 720, according to an illustrative implementation. In the power supply 700, the output 750a of the first switched block 740a is connected in parallel with the unregulated voltage bus 720.

The power supply 700 receives an input voltage 710, which is fed in series through each of the switched blocks 740a-740n (collectively "switched blocks 740"). That is, the input voltage is connected to a first input terminal of the first switched block 740a, the second input terminal of the first switched block 740a is connected to the first input terminal of the second switched block 740b, the second input terminal of the second switched block 740b is connected to the first input terminal of the next switched block 640, and so on. The second input terminal of the last switched block 740n is connected to an unregulated voltage bus 720. The unregulated voltage bus 720 connects to one or more voltage regulators (not shown), which regulate the output voltage of the switched blocks 740 in the same manner as described previously for the power supplies 400 and 500.

Each switched block 740 of the power supply 700 has an output 750a-750n (collectively "output 750"). In the example power supply 700, a second output terminal of each switched block 740a-740n is connected to ground 730. Thus, each output voltage V_1 through V_N as provided at each first output terminal of the switched blocks 740 is referenced to ground potential.

In addition, the unregulated voltage bus 720 connects to a first output terminal of the first output 750a of the first switched block 740a. The rest of the outputs 750b-750n can be connected to independent voltage sources (voltage regulators). Therefore, VBUS=V_1=0.5*(VIN−SUM{V_2 . . . V_N}).

Figure 8:
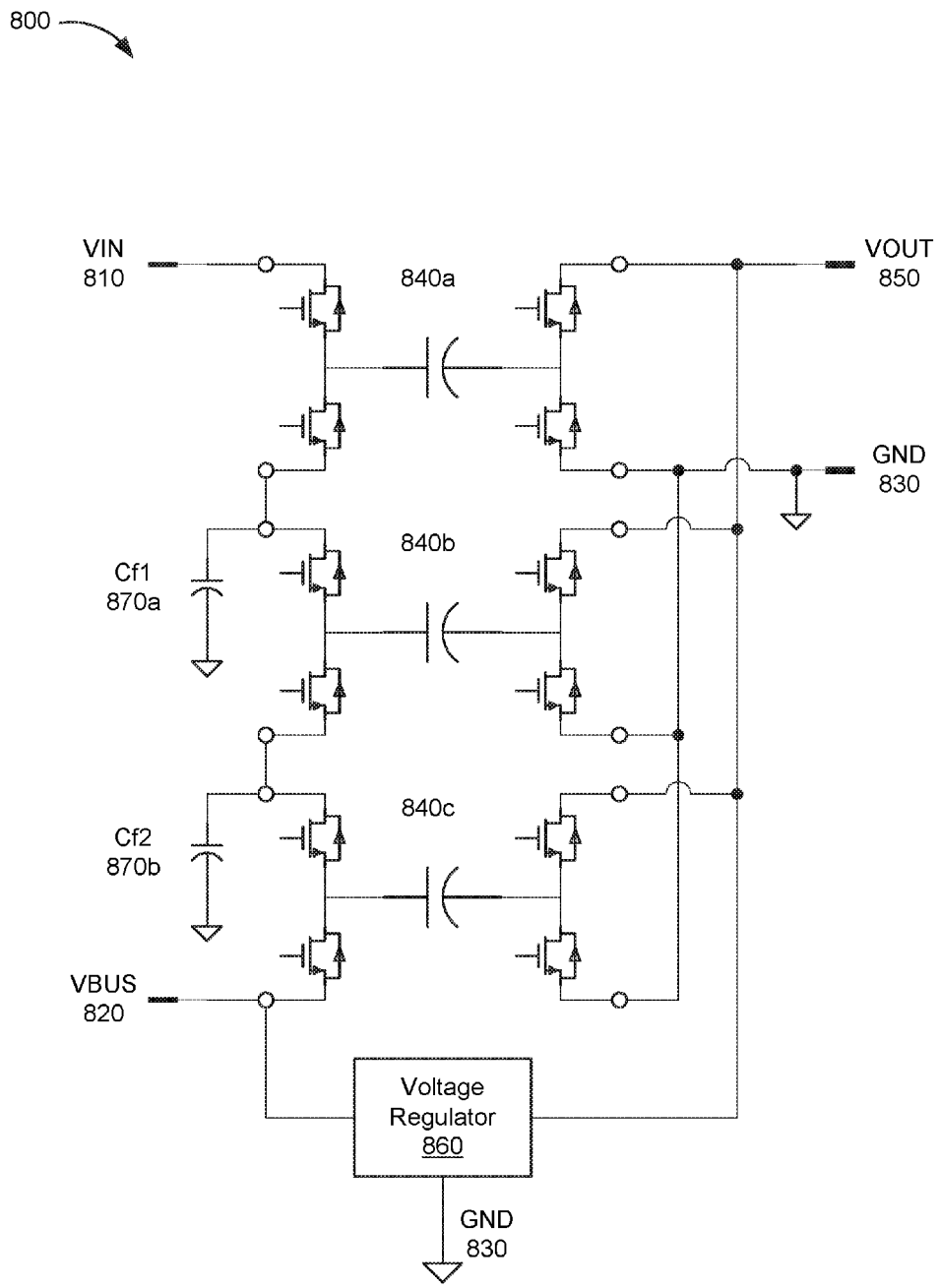
FIG. 8 shows a schematic of a power supply architecture having a single regulated output, according to an illustrative implementation.

FIG. 8 shows a simplified schematic of a power supply 800 architecture having a single regulated output 850, according to an illustrative implementation. The power supply 800 includes three switched blocks 840a, 840b, and 840c (collectively "switched blocks 840"). The inputs of the switched blocks 840 are connected in series between the input voltage 810 and the unregulated voltage bus 820. The outputs of the switched blocks 840 are connected in parallel to yield a single output 850 relative to ground 830. The output voltage VOUT is regulated by a voltage regulator 860.

In the power supply 800, each switched block 840 includes a capacitor. Each switched block 840 can produce an output voltage that is in phase with the other switched blocks 840, when the individual solid-state switches of the switched blocks 840 are controlled in the same manner. In some implementations, filtering capacitors 870a and 870b (collectively "filtering capacitors 870") can be added to as desired for energy buffering and for clamping the voltages across the solid-state switches.

In some implementations, the input voltage 810 VIN can have a nominal value of 54 V and a range of approximately 40-60 V. The output 850 voltage VOUT can be regulated to 12 V. The unregulated voltage bus 820 can therefore be operating at a nominal voltage VBUS of 18 V with a range of approximately 4V-24 V. Accordingly, a non-inverting buck-boost converter can be used as the voltage regulator 860.

In the example power supply 800 and at the example operating parameters described above, at steady state under nominal conditions, the voltage regulator 860 need only carry ⅓ of the total power. If each switched block 840 has an efficiency of 98% and the voltage regulator has an efficiency of 96%, the total efficiency can be 97.3%. In contrast, using a two-stage configuration in which the entire output of the unregulated voltage converters passes through a voltage regulator, the voltage regulator would have to handle two times the power, and the efficiency would be 98%*96%=94.1%.

Figure 9:
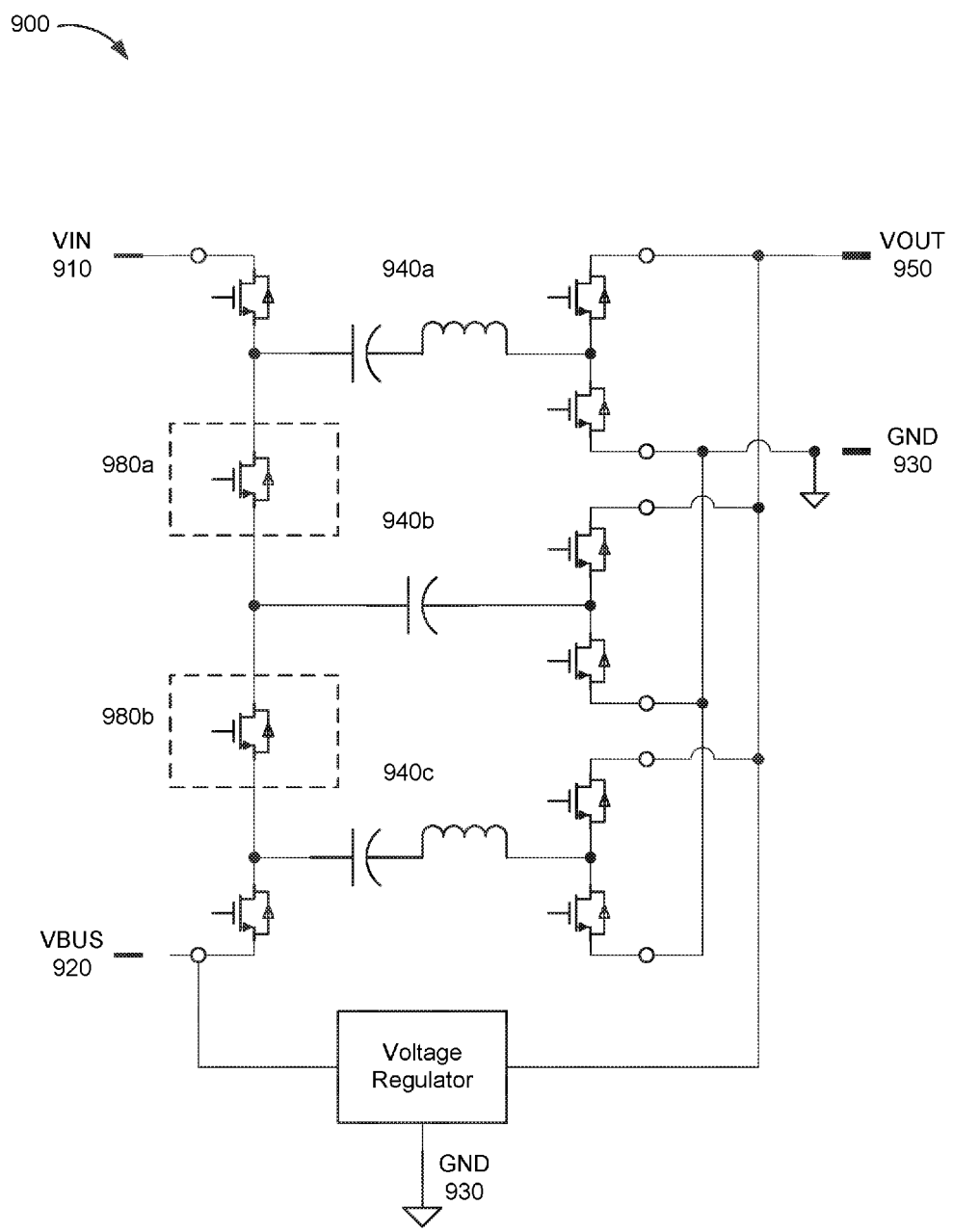
FIG. 9 shows a schematic of a power supply architecture having a single regulated output, according to an illustrative implementation.

FIG. 9 shows a simplified schematic of a power supply 900 architecture having a single regulated output 950, according to an illustrative implementation. The power supply 900 is similar to the power supply 800; however, in the power supply 900, the middle switched block 940b (or, in implementations having four or greater switched blocks, even-numbered switched blocks) has pulse-width modulator (PWM) logic shifted 180 degrees from the other switched blocks. This allows the function of some solid-state switches to be merged into a single solid-state switch, such as the solid-state switches 980a and 980b (collectively "solid-state switches").

The power supply 900 includes three switched blocks 940a, 940b, and 940c (collectively "switched blocks 940"). The inputs of the switched blocks 940 are connected in series between the input voltage 910 and the unregulated voltage bus 920. The outputs of the switched blocks 940 are connected in parallel to yield a single output 950 relative to ground 930. The output voltage VOUT is regulated by a voltage regulator 960.

The switched blocks 940a and 940c include a capacitor and an inductor connected in series (an "LC" or "tank" circuit). The switched block 940b includes a capacitor. In implementations having four or more switched blocks 940, alternating switched blocks will have a capacitor and the other switched blocks will have tank circuit. Each switched block 940 can produce an output voltage that is in phase with the other switched blocks 940. Unlike the power supply 800, however, the individual solid-state switches are not controlled in the same manner, but rather, alternating switched blocks have PWM logic that is shifted 180 degrees from the other switched blocks. In this configuration, the solid-state switch at the second input terminal of a switched block 940 would open and close synchronously with the solid-state switch at the first input terminal of the next switched block 940. Accordingly, both solid-state switches can be replaced by a single solid-state switch—e.g., solid-state switches 980a and 980b—performing the functions of both. Merging the solid-state switches in this manner can further reduce the size and increase the density of the power supply 900.

An additional advantage of the power supply 900 is the combination of capacitor and tank circuit switched blocks 940. This mix of the capacitor and the tank switched blocks 940 can allow for resonant operation, which can achieve higher efficiencies. For example, the PWM controllers of the switched blocks can be synchronized with the resonant frequency of the tank circuits such that switching is done at the current zero crossings, thereby reducing switching losses. That is, the PWMs can be timed to switch the solid-state switches at times when little or no current is flowing through them. This can reduce the power dissipated by the solid-state switches when transitioning from off to on and back again. The resonant frequency of the tank circuits will depend at least in part on the values of the capacitor and inductor of the tank circuit. The capacitor only switched blocks (i.e., switched block 940*b*) will include a non-resonant capacitor. The value of the non-resonant capacitor can be an order of magnitude or more larger than the magnitude of the resonant capacitors in the switched blocks 940*a* and 940*c*. Thus, the non-resonant capacitor will have little or no influence on the resonant frequency of the tank circuit when the solid-switches 980 connect them.

Figure 10:
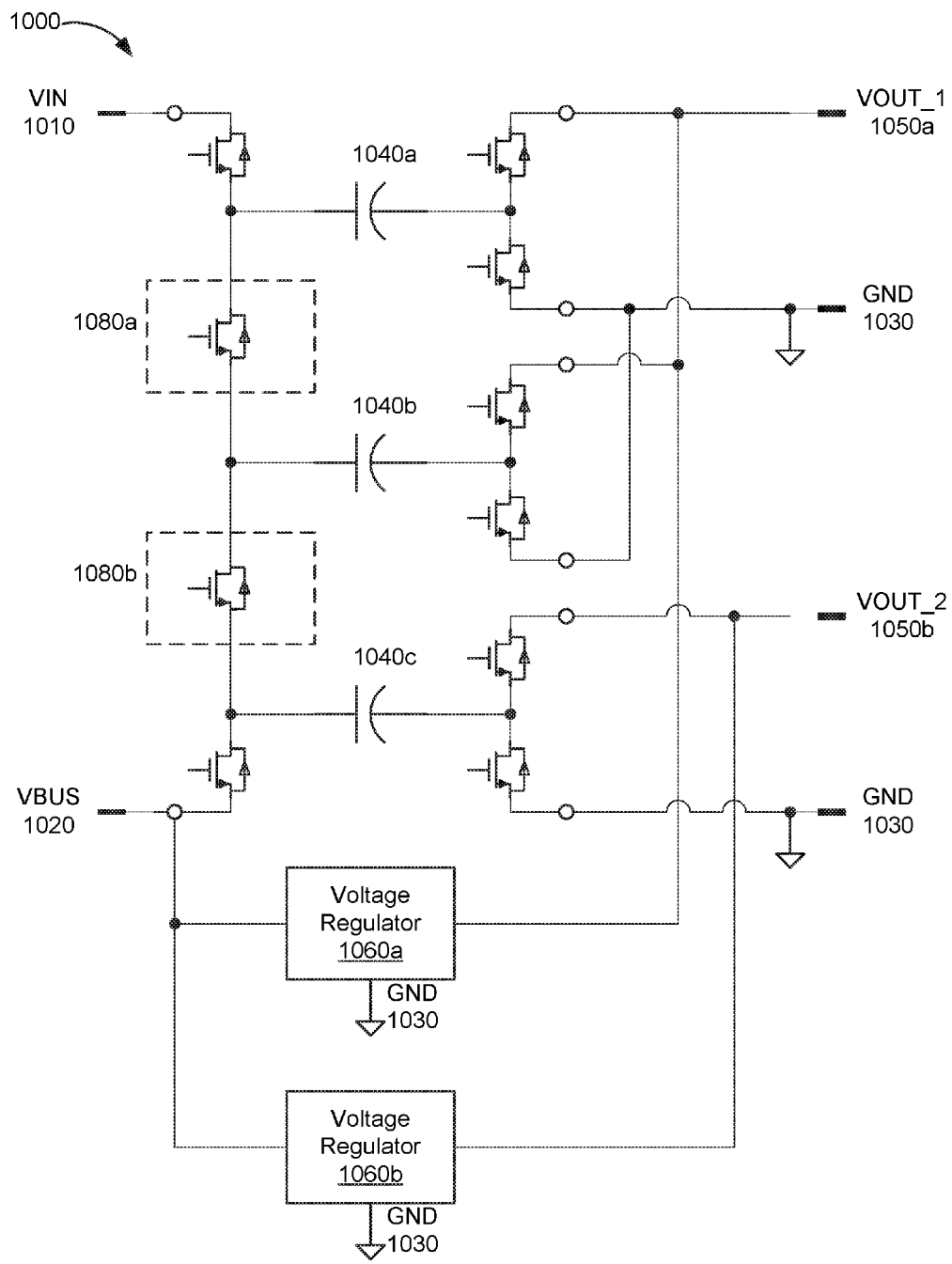
FIG. 10 shows a schematic of a power supply architecture having two independent regulated outputs, according to an illustrative implementation.

FIG. 10 shows a simplified schematic of a power supply 1000 architecture having two independent regulated outputs 1050*a* and 1050*b* (collectively "outputs 1050"), according to an illustrative implementation. The power supply 1000 includes three switched blocks 1040*a*, 1040*b*, and 1040*c* (collectively "switched blocks 1040"). The inputs of the switched blocks 1040 are connected in series between the input voltage 1010 and the unregulated voltage bus 1020. Similar to the power supply 900, the middle switched block 1040*b* (or, in implementations having four or greater switched blocks, alternating switched blocks) has pulse-width modulator (PWM) logic shifted 180 degrees from the other switched blocks. This allows the function of some solid-state switches to be merged into a single solid-state switch, such as the solid-state switches 1080*a* and 1080*b* (collectively "solid-state switches").

The output of the switched block 1040*b* is connected in parallel to the output of the switched block 1040*a* to yield a single output 1050*a* relative to ground 1030. The output 1050*a* is also connected in parallel with the output of the voltage regulator 1060*a*, which regulates the voltage VOUT_1 at the output 1050*a*. The output 1050*b* of the switched block 1040*c* is connected in parallel with the output of the voltage regulator 1060*b*, which regulates the voltage VOUT_2 at the output 1050*b*.

In some implementations, the input voltage 1010 VIN can have a nominal value of 54 V and a range of approximately 40 to 60 V. The output 1050*a* voltage VOUT_1 can be regulated to 12 V, and the output 1050*b* voltage VOUT_2 can be regulated to 5 V. Thus the unregulated voltage bus will be running at a nominal voltage VBUS=VIN−2*VOUT_1−VOUT_2=54−2*12 V−5 V=25 V nominal, with a range of approximately 11-31 V. Accordingly, in some implementations, the voltage regulator 1060*a* can use a non-inverting buck-boost converter, and the voltage regulator 1060*b* can use a buck converter.

Figure 11:
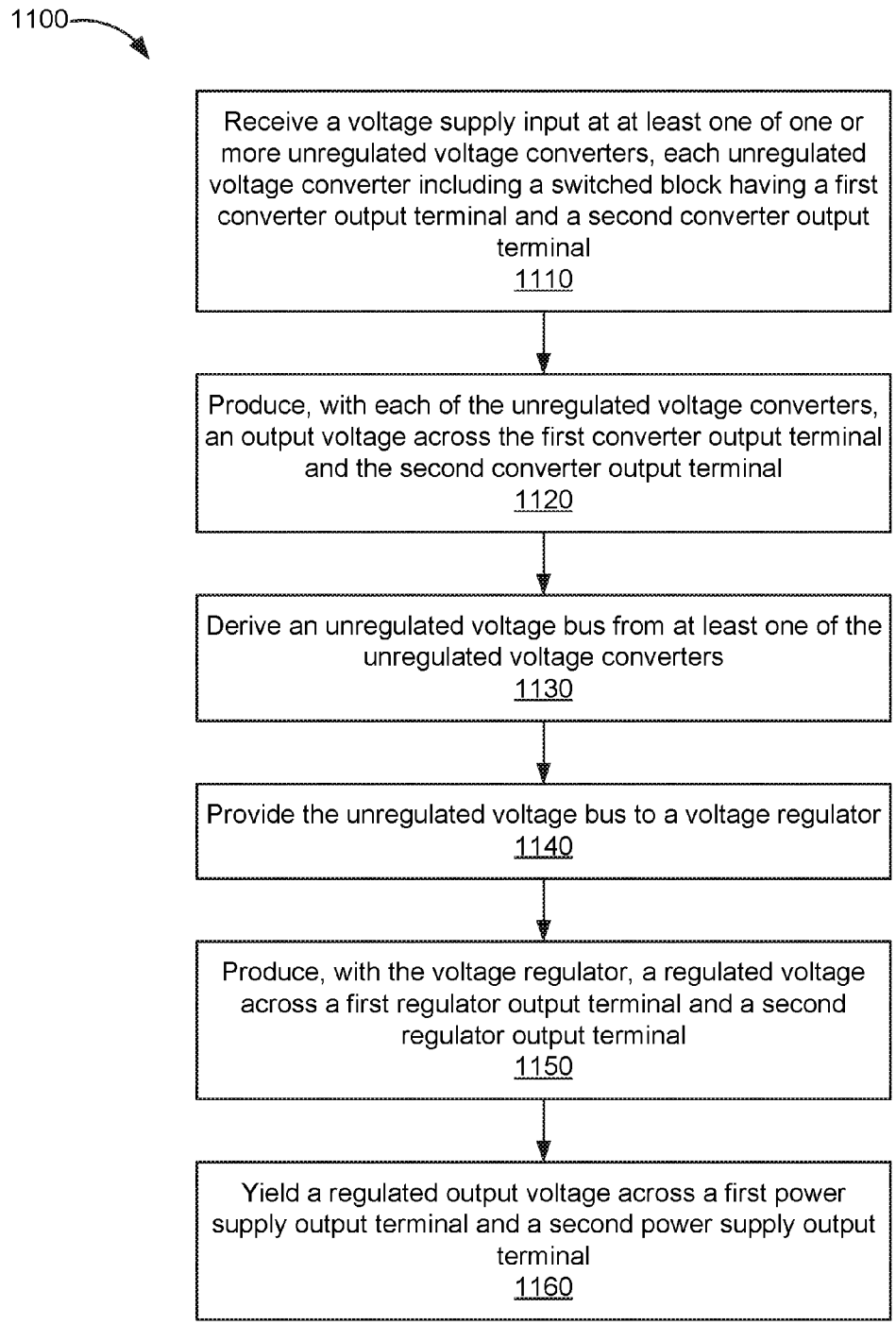
FIG. 11 shows flow chart describing an example method of generating a regulated power supply, according to an illustrative implementation.

FIG. 11 shows flow chart describing an example method 1100 of generating a regulated power supply, according to an illustrative implementation. The method 1100 can be performed using one or more of the power supplies 400, 500, 600, 700, 800, 900, or 1000 described previously. The method 1100 includes coupling a voltage supply input to at least one of one or more unregulated voltage converters (stage 1110). The method 1100 includes producing, with each of the unregulated voltage converters, an output voltage across a first converter output terminal and a second converter output terminal (stage 1120). The method 1100 includes deriving an unregulated voltage bus from at least one of the unregulated voltage converters (stage 1130). The method 1100 includes providing the unregulated voltage bus to a voltage regulator (stage 1140). The method 1100 includes producing, with the voltage regulator, a regulated voltage across a first regulator output terminal and a second regulator output terminal (stage 1150). The method 1100 includes yielding a regulated output voltage across a first power supply output terminal a second power supply output terminal (stage 1160).

The method 1100 includes receiving a voltage supply input at at least one of one or more unregulated voltage converters (stage 1110). The voltage supply input can receive an input voltage, such as the input voltage 410, 510, 610, 710, 810, 910, or 1010. The input voltage can be coupled to a switched block of an unregulated voltage converter, such as the switched block 440, 540, 640, 740, 840, 940, or 1040. The switched block can include a capacitor or a tank circuit. Each switched block can have a first converter output terminal and a second converter output terminal.

The method 1100 includes producing, with each of the unregulated voltage converters, an output voltage across the first converter output terminal and the second converter output terminal (stage 1120). A pulse-width modulator (PWM), such as the PWM 132, 142, 232, or 242 can control switches in the switched block to convert a voltage across a first converter input terminal and a second converter input terminal to a voltage across the first converter output terminal and the second converter output terminal. The output voltage may vary with the input voltage.

The method 1100 includes deriving an unregulated voltage bus from at least one of the unregulated voltage converters (stage 1130). The input voltage and the unregulated voltage bus, such as the unregulated voltage bus 420, 520, 620, 720, 820, 920, or 1020, can be connected through the input side of the switched blocks in series. That is, the input voltage can be coupled to the first converter input terminal of the first switched block. The second converter input terminal of the first switched block can be connected to the first converter input terminal of the second switched block, and so on. The second converter input terminal of the last switched block can be connected to the unregulated voltage bus.

The method 1100 includes providing the unregulated voltage bus to a voltage regulator (stage 1140). The unregulated voltage bus can be connected to the input of one or more voltage regulators, such as the voltage regulators 460, 560, 860, 960, or 1060.

The method 1100 includes producing, with the voltage regulator, a regulated voltage across a first regulator output terminal and a second regulator output terminal (stage 1150). The regulated voltage produced by the voltage regulator can be used to regulate the output of one or more of the unregulated voltage converters. The type of voltage regulator used can depend on the nominal regulated voltage and the expected range of voltages that will appear on the unregulated voltage bus.

The method 1100 includes yielding a regulated output voltage across a first power supply output terminal a second power supply output terminal (stage 1160). The output terminals of the voltage regulator and the output terminals of one or more unregulated voltage converters can be connected in parallel to provide power at a regulated voltage to a load. That is, the first power supply output terminal is connected to the first regulator output terminal and the first converter output terminal of at least one of the unregulated voltage converters, and the second power supply output terminal is connected to the second regulator output terminal and the second converter output terminal of the at least one unregulated voltage converter. By connecting these outputs in parallel, the voltage regulator need only source enough power to regulate the outputs of the unregulated voltage converters, and not necessarily the full output power of the power supply. Accordingly, much of the power can be provided by the unregulated converters, which are smaller, more efficient, and less expensive than the voltage regulators. Therefore, the power supply can be smaller, cheaper, and more efficient than power supplies with a two-stage cascade configuration of unregulated voltage converters and voltage regulators.

In some implementations, the method can include connecting the voltage regulator output terminals in parallel to the output terminals of at least two unregulated voltage converters. That is, the first power supply output terminal can be connected to the first converter output terminal of at least two unregulated voltage converters, and the second power supply output terminal can be connected to the second converter output terminal of the at least two unregulated voltage converters.

In some implementations, the method can include providing the unregulated voltage bus to a second voltage regulator, and producing a second regulated voltage. The method can include connecting the output terminals of the second voltage regulator in parallel to one or more additional unregulated voltage converters. The power supply can thus yield two different regulated output voltages.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A power supply comprising:
    one or more unregulated voltage converters, each unregulated voltage converter including a switched block producing an output voltage across a first converter output terminal and a second converter output terminal;
    a voltage supply input coupled to at least one of the unregulated voltage converters;
    an unregulated voltage bus coupled to at least one of the unregulated voltage converters; and
    a voltage regulator coupled to the unregulated voltage bus and producing a regulated voltage across a first regulator output terminal and a second regulator output terminal,
        wherein the first regulator output terminal is connected to the first converter output terminal of at least one of the unregulated voltage converters, and the second regulator output terminal is connected to the second converter output terminal of the at least one unregulated voltage converter, to yield a regulated output voltage across a first power supply output terminal and a second power supply output terminal.

2. The power supply of claim 1, wherein each switched block includes:
    a first solid-state switch between a first input terminal of the switched block and a first terminal of a capacitor;
    a second solid-state switch between a second input terminal of the switched block and a second terminal of the capacitor;
    a third solid-state switch between the first terminal of the capacitor and the first converter output terminal of the switched block; and
    a fourth solid-state switch between the second terminal of the capacitor and the second converter output terminal of the switched block.

3. The power supply of claim 1, wherein each switched block includes:
    a first solid-state switch between a first input terminal of the switched block and a first terminal of a capacitor;
    a second solid-state switch between a second input terminal of the switched block and the first terminal of the capacitor;
    a third solid-state switch between a second terminal of the capacitor and the first converter output terminal of the switched block; and
    a fourth solid-state switch between the second terminal of the capacitor and the second converter output terminal of the switched block.

4. The power supply of claim 3, wherein the third solid-state switch and the fourth solid-state switch have a voltage rating less than a maximum input voltage of the voltage supply input and greater than or equal to the regulated output voltage.

5. The power supply of claim 1, wherein each switched block includes:
    a tank circuit including a capacitor coupled in series to an inductor, the tank circuit having a first terminal and a second terminal;
    a first solid-state switch between a first input terminal of the switched block and the first terminal of the tank circuit;
    a second solid-state switch between a second input terminal of the switched block and a second terminal of the tank circuit;
    a third solid-state switch between the first terminal of the tank circuit and the first converter output terminal of the switched block; and
    a fourth solid-state switch between the second terminal of the tank circuit and the second converter output terminal of the switched block.

6. The power supply of claim 1, wherein each switched block includes:
    a tank circuit including a capacitor coupled in series to an inductor, the tank circuit having a first terminal and a second terminal;

a first solid-state switch between a first input terminal of the switched block and a first terminal of the tank circuit;

a second solid-state switch between a second input terminal of the switched block and the first terminal of the tank circuit;

a third solid-state switch between a second terminal of the tank circuit and first converter output terminal of the switched block; and a fourth solid-state switch between the second terminal of the tank circuit and the second converter output terminal of the switched block.

7. The power supply of claim 6, wherein the third solid-state switch and the fourth solid-state switch have a voltage rating less than a maximum input voltage of the voltage supply input and greater than or equal to the regulated output voltage.

8. The power supply of claim 1, wherein the voltage regulator has a non-inverting buck-boost configuration.

9. The power supply of claim 1, wherein the voltage regulator has an inverting buck-boost configuration.

10. The power supply of claim 1, comprising N switched blocks numbered $B_1$ through $B_N$, wherein:

each switched block has a first converter input terminal and a second converter input terminal;

the voltage supply input is coupled to the first converter input terminal of the $B_1$ switched block;

the unregulated voltage bus is coupled to the second converter input terminal of the $B_N$ switched block; and for each switched block numbered $B_2$ through $B_N$, a first converter input terminal of the $B_i$ switched block is coupled to the second converter input terminal of the $B_{i-1}$ switched block.

11. The power supply of claim 10, comprising at least three switched blocks, wherein:

the switched block $B_1$ includes:

a first solid-state switch between the first converter input terminal of the switched block and a first terminal of a capacitor;

for switched blocks numbered $B_1$ through $B_{N-1}$, each switched block $B_i$ includes:

a second solid-state switch between the first terminal of the capacitor and a first terminal of the $B_{i+1}$ capacitor; and the switched block $B_N$ includes:

a third solid-state switch between the first terminal of the capacitor and the second converter input terminal of the switched block.

12. The power supply of claim 10, comprising at least three switched blocks, wherein:

for odd values of i, the $B_i$ switched block includes a tank circuit having a capacitor and an inductor coupled in series; and for even values of i, the $B_i$ switched block includes a capacitor.

13. The power supply of claim 12, wherein:

the switched block $B_1$ includes:

a first solid-state switch between the first converter input terminal of the switched block and a first terminal of the capacitor or tank circuit;

for switched blocks numbered $B_1$ through $B_{N-1}$, each switched block $B_i$ includes:

a second solid-state switch between the first terminal of the capacitor or tank circuit and a first terminal of the $B_{i+1}$ capacitor or tank circuit; and the switched block $B_N$ includes:

a third solid-state switch between the second converter input terminal of the switched block and the first terminal of the capacitor or tank circuit.

14. The power supply of claim 10, wherein:

the first regulator output terminal is connected to the first converter output terminal of at least a second of the unregulated voltage converters, and the second regulator output terminal is connected to the second converter output terminal of the second unregulated voltage converter.

15. The power supply of claim 10, wherein the voltage regulator is a first voltage regulator, the power supply comprising:

a second voltage regulator coupled to the unregulated voltage bus and producing a second regulated voltage across a third regulator output terminal and a fourth regulator output terminal, wherein the third regulator output terminal is connected to the first converter output terminal of at least a second of the unregulated voltage converters, and the fourth regulator output terminal is connected to the second converter output terminal of the second unregulated voltage converter, to yield a second regulated output voltage across a third power supply output terminal and a fourth power supply output terminal.

16. The power supply of claim 10, wherein each switched block includes:

a first solid-state switch between the first converter input terminal of the switched block and a first terminal of a capacitor;

a second solid-state switch between the second converter input terminal of the switched block and the first terminal of the capacitor;

a third solid-state switch between a second terminal of the capacitor and the first converter output terminal of the switched block; and a fourth solid-state switch between the second terminal of the capacitor and the second converter output terminal of the switched block, wherein the first input terminal of each switched block numbered $B_2$ through $B_N$ is coupled to a shunt capacitor.

17. The power supply of claim 10, wherein each switched block includes:

a first solid-state switch between the first converter input terminal of the switched block and a first terminal of a capacitor;

a second solid-state switch between the second converter input terminal of the switched block and the first terminal of the capacitor;

a third solid-state switch between a second terminal of the capacitor and the first converter output terminal of the switched block; and a fourth solid-state switch between the second terminal of the capacitor and the second converter output terminal of the switched block, wherein for even values of i, the first converter output terminal of the $B_i$ switched block is coupled to the second converter output terminal of at least one odd numbered $B_j$ switched block, and the second converter output terminal of the $B_i$ switched block is coupled to the first converter output terminal of the at least one odd numbered $B_j$ switched block.

18. A method of generating a regulated power supply comprising:

receiving a voltage supply input at at least one of one or more unregulated voltage converters, each unregulated voltage converter including a switched block having a first converter output terminal and a second converter output terminal;

producing, with each of the unregulated voltage converters, an output voltage across the first converter output terminal and the second converter output terminal;

deriving an unregulated voltage bus from at least one of the unregulated voltage converters;

providing the unregulated voltage bus to a voltage regulator;

producing, with the voltage regulator, a regulated voltage across a first regulator output terminal and a second regulator output terminal; and yielding a regulated output voltage across a first power supply output terminal a second power supply output terminal, wherein:

the first power supply output terminal is connected to the first regulator output terminal and the first converter output terminal of at least one of the unregulated voltage converters, and the second power supply output terminal is connected to the second regulator output terminal and the second converter output terminal of the at least one unregulated voltage converter.

19. The method of claim 18, comprising:

providing the unregulated voltage bus to a second voltage regulator;

producing, with the second voltage regulator, a second regulated voltage across a third regulator output terminal and a fourth regulator output terminal; and yielding a second regulated output voltage across a third power supply output terminal and a fourth power supply output terminal, wherein:

the third power supply output terminal is connected to the third regulator output terminal and the first converter output terminal of at least a second of the unregulated voltage converters, and the fourth power supply output terminal connected to the fourth regulator output terminal and the second converter output terminal of the second unregulated voltage converter.

20. The method of claim 18, wherein:

the first power supply output terminal is connected to the first converter output terminal of at least two unregulated voltage converters; and the second power supply output terminal is connected to the second converter output terminal of the at least two unregulated voltage converters.

* * * * *